(12) United States Patent
Matsumoto et al.

(10) Patent No.: US 7,815,027 B2
(45) Date of Patent: Oct. 19, 2010

(54) LOCK-UP CLUTCH MECHANISM

(75) Inventors: Hideki Matsumoto, Fukuroi (JP); Hideaki Takabayashi, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 515 days.

(21) Appl. No.: 11/590,843

(22) Filed: Nov. 1, 2006

(65) Prior Publication Data
US 2007/0108007 A1 May 17, 2007

(30) Foreign Application Priority Data
Nov. 11, 2005 (JP) .............................. 2005-327552

(51) Int. Cl.
*F16H 45/02* (2006.01)
(52) U.S. Cl. .................. 192/3.29; 192/52.2; 192/107 R
(58) Field of Classification Search ................. 192/52.1, 192/52.2, 52.3
See application file for complete search history.

(56) References Cited
U.S. PATENT DOCUMENTS 4,469,206 A * 9/1984 Motomura et al. ......... 192/52.2
6,401,898 B1 * 6/2002 Shimoi et al. ........... 192/107 R
6,524,681 B1 * 2/2003 Seitz et al. ............... 192/107 M
2003/0150682 A1 * 8/2003 Yokodana et al. .......... 192/3.29
2004/0050646 A1 * 3/2004 Matthes et al. .......... 192/107 R
2006/0118378 A1 * 6/2006 Fujii et al. ................. 192/3.28

FOREIGN PATENT DOCUMENTS
JP  3157213 B2  2/2001
JP  2004-11710 A  1/2004

OTHER PUBLICATIONS
Translation of JP 2004-011710 A, Ushio, Jan. 2004.*
* cited by examiner Primary Examiner—Rodney H Bonck
(74) Attorney, Agent, or Firm—Miles & Stockbridge P.C.

(57) ABSTRACT

The present invention provides a lock-up clutch mechanism for a torque converter, comprising a lock-up piston and a front cover opposed to the lock-up piston and wherein a friction material having a friction surface is secured to one of the lock-up piston and the front cover, and the friction surface includes an outer peripheral friction surface which is engaged at an initial stage of engagement between the lock-up piston and the front cover and an inner peripheral friction surface which is engaged upon tightening, and the outer peripheral friction surface has a taper with respect to the inner peripheral friction surface, and the inner peripheral friction surface and the outer peripheral friction surface are subjected to a cutting operation.

12 Claims, 2 Drawing Sheets

LOCK-UP CLUTCH MECHANISM

BACKGROUND OF THE INVENTION

1. Field of the Invention

The present invention relates to a lock-up clutch mechanism used with a torque converter of an automatic transmission for a vehicle, and more particularly, it relates to an improvement in a friction sliding surface of the lock-up clutch mechanism.

2. Related Background Art

In torque converters used in automatic transmissions, although smooth starting, acceleration and deceleration can be achieved, since a power is transmitted via fluid, a transmitting efficiency is worsened. Thus, there has been proposed a technique in which, if a speed of the vehicle exceeds a predetermined value, in order to reduce energy loss and to enhance reduction of fuel consumption, a lock-up clutch mechanism having a lock-up clutch is operated to directly connect an engine to drive wheels.

Further, in recent years, in order to further enhance the reduction of the fuel consumption, the lock-up clutch mechanism has been operated even when the vehicle is being driven at a low speed. In this case, in order to reduce vibration of the engine at the low speed and transmission shock, a so-called slip lock-up control for performing a lock-up control while maintaining a slip amount at predetermined revolutions per minute is adopted.

In general, in the lock-up clutch, self-exciting vibration referred to as judder may be generated, thereby worsening comfort of the vehicle considerably. The judder is greatly influenced by imbalance of face pressure distribution on a friction surface in a circumferential direction during the slip. The imbalance of the face pressure distribution is greatly influenced by accuracy of the friction surface, and, thus, there arises dispersion in the circumferential direction of the friction surface by slight undulation of a piston of the lock-up clutch and/or strain of attaching bolts for a drive plate provided on a front cover.

In order to suppress such judder, for example, in Japanese Patent No. 3157213, a friction surface to be engaged at the initiation of engagement is formed as a cut low resin ratio layer.

Further, Japanese Patent Application Laid-Open No. 2004-11710 discloses a lock-up clutch having a friction engaging surface comprising a tapered surface in which a thickness of a friction material is reduced from a radial outer periphery to a radial inner periphery.

However, since the generation of the judder is greatly based on the imbalance of the face pressure distribution on the friction surface in the circumferential direction during the slipping, in the techniques disclosed in the Japanese Patent No. 3157213 and the Japanese Patent Application Laid-Open No. 2004-11710, the judder could not necessarily be suppressed satisfactorily. Further, it was difficult to obtain the greater torque transmitting capacity.

Further, in a condition that maximum engaging pressure is generated during the engagement of the lock-up clutch, the inner peripheral portion of the friction material of the lock-up piston is contacted with the front cover. In this case, the entire surface of the lining to be contacted remains a configuration obtained when it is stuck or adhered, and thus, there is roughness or undulation on the surface of the friction material. From this condition, if the friction material is engaged with or tightened to an opponent member, there is a danger of generating local areas where a void is created between the friction material and the opponent member and local areas where higher contact pressure is created between the friction material and the opponent member.

As a result, a contacting condition at the interface between the friction material and the opponent member becomes unstable to generate the judder easily, and a sealing ability of the interface is worsened, thereby reducing the capacity.

SUMMARY OF THE INVENTION

Accordingly, an object of the present invention is to provide a lock-up clutch mechanism with a simple construction, which can make face pressure of a friction surface in a circumferential direction more uniform, thereby preventing occurrence of judder and enhancing a sealing ability of an interface to increase a torque transmitting capacity.

To achieve the above object, the present invention provides a lock-up clutch mechanism for a torque converter, comprising a lock-up piston and a front cover opposed to the lock-up piston and wherein a friction material having a friction surface is secured to one of the lock-up piston and the front cover, and the friction surface includes an outer peripheral friction surface which is engaged at an initial stage of engagement between the lock-up piston and the front cover and an inner peripheral friction surface which is engaged upon tightening, and the outer peripheral friction surface has a taper with respect to the inner peripheral friction surface, and the inner peripheral friction surface and the outer peripheral friction surface are subjected to a cutting operation.

Since the friction material is provided with the outer peripheral friction surface engaged at the initial stage of engagement between the lock-up piston and the front cover and the inner peripheral friction surface engaged upon the tightening and the outer peripheral friction surface has the taper with respect to the inner peripheral friction surface and the inner peripheral friction surface and the outer peripheral friction surface are subjected to the cutting operation, a contacting condition at an interface between the lock-up friction material and a contact area of the front cover can be maintained to a good (uniform) state, with the result that a judder suppressing ability is enhanced by reducing contact unstable factors during the sliding movement and the increase in a reaction force caused by the urging pressure from the interface is suppressed by enhancing a sealing ability of the interface, thereby enhancing the capacity by using the urging force effectively.

Further, even if an urging force of the piston is changed, since the uniformity pf the friction face pressure in the circumferential direction is maintained more stably, the judder can be suppressed. Further, fluctuation of the lock-up piston can also be suppressed. In addition, the good judder suppressing ability can be obtained within a wide range from the initiation of the engagement to the complete tightening.

Further features of the present invention will become apparent from the following description of exemplary embodiments (with reference to the attached drawings).

DESCRIPTION OF THE EMBODIMENTS

Figure 1:
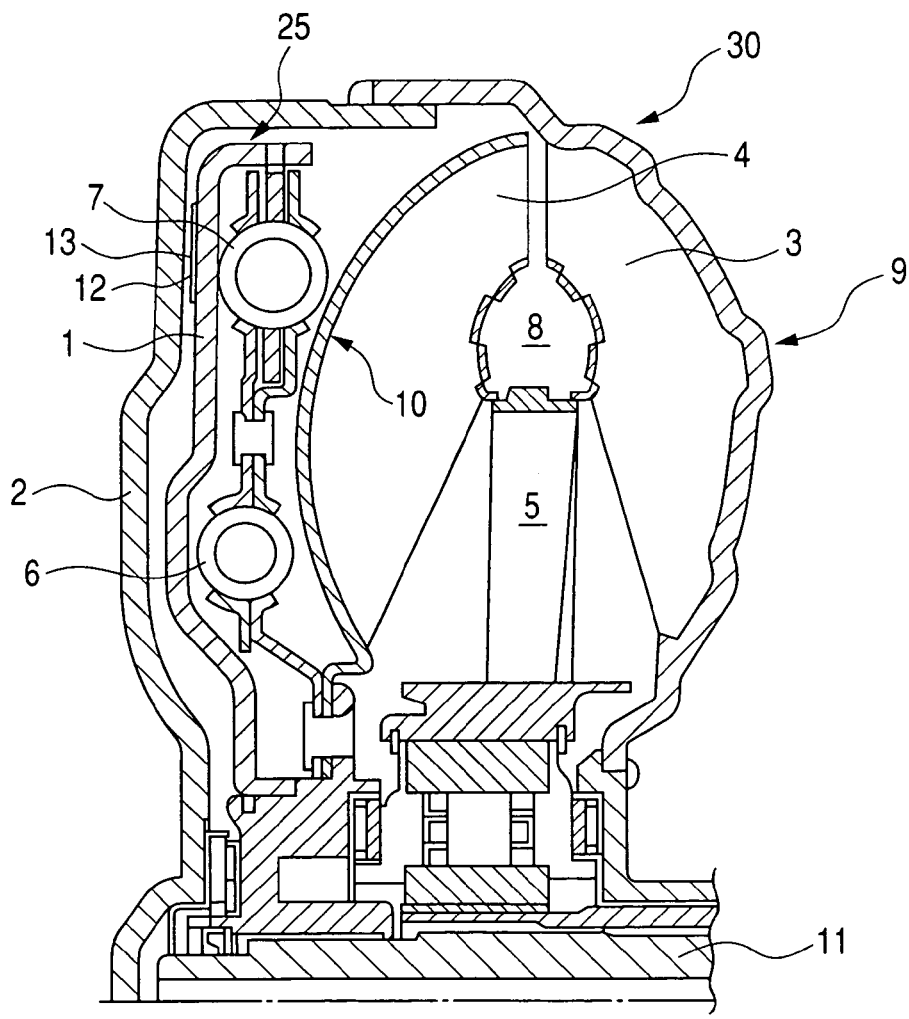
FIG. 1 is an axial partial sectional view of a torque converter having a lock-up clutch mechanism according to the present invention.

Now, an embodiment of the present invention will be fully explained with reference to the accompanying drawings. In the drawings, the same elements or members are designated by the same reference numerals. Further, it should be noted that an embodiment which will be described hereinbelow is merely exemplary and does not limit the present invention in all senses.

FIG. 1 is an axial partial sectional view of a torque converter 30 having a lock-up clutch mechanism according to the present invention, showing a released condition of a lock-up clutch. The torque converter 30 comprises a front cover 2 constituting a part of a housing of the torque converter 30, an impeller 9 as a donut-shaped vane wheel secured to the front cover 2, a turbine 10 as a donut-shaped vane wheel having blades or vanes opposed to vanes of the impeller 9, and a stator 5 rotatably provided between the impeller 9 and the turbine 10. The impeller 9, turbine 10 and stator 5 constitute a main body of the torque converter.

The impeller 9 is connected to a crankshaft (not shown) of an engine (not shown) of a vehicle and is adapted to be rotated together with the front cover 2 as the engine is driven. Further, the turbine 10 is directly connected to an output shaft 11 and is also connected to a wheel (not shown) via a transmission mechanism (not shown). The stator 5 is disposed between the impeller 9 and an inner peripheral central portion of the turbine 10 and has a function for changing a flow of fluid filled in the torque converter 30.

Between an inner surface of the front cover 2 and an outer surface of the turbine 10, there is provided a lock-up clutch or lock-up piston 1 as an annular plate which performs a piston operation; the lock-up piston constitutes a lock-up clutch mechanism and has a surface, opposed to an inner surface of the front cover, onto which a friction material 12 is adhered by an adhesive. The lock-up piston is rotated integrally with the output shaft 11. A friction surface 13 of the friction material 12 is opposed to the inner surface of the front cover 2. Incidentally, for simplicity's sake of the explanation, the lock-up piston is referred to merely as "piston".

Between an outer surface of the turbine 10 and the piston 1, there is provided a damper mechanism comprising coil springs 6 and 7 in order to dampen shock caused upon tightening of the piston 1. Further, a central space 8 is defined at a central portion of the torque converter 30.

Next, an operation of the piston 1 will be described. When a speed of the vehicle exceeds a predetermined speed value, a feedback control is performed by a control mechanism (not shown), with the result that the flow of the fluid in the torque converter 30 defined by the impeller 9 and the turbine 10 is automatically changed. Due to such change, the piston is urged against the inner surface of the front cover 2, with the result that the friction material 12 of the piston 1 is tightened to the inner surface of the front cover 2, thereby establishing a direct connection condition of the piston 1. As a result, a driving force of the engine is directly transmitted to the output shaft 11. Accordingly, since a drive side and an output side are mechanically locked-up (directly connected) without the fluid, fluid loss can be prevented, thereby enhancing reduction of fuel consumption.

Incidentally, the torque converter 30 is connected to a hydraulic control mechanism (not shown) and the hydraulic control mechanism controls to change (increase or decrease) a flow rate of oil (fluid) while maintaining a pressure difference (pressure difference across the piston 1) between two paths disposed on both sides of the piston 1, i.e. the outer peripheral side and the inner peripheral side substantially constant, in order to maintain the slip condition of the piston 1.

Figure 2:
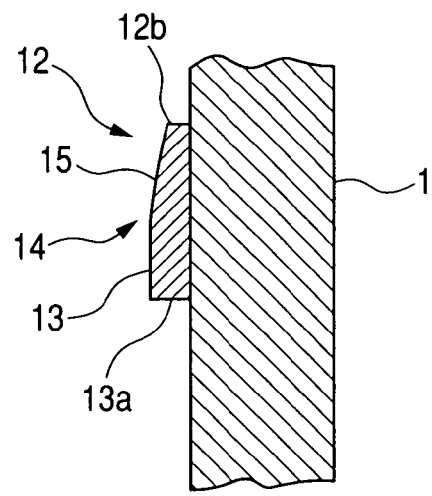
FIG. 2 is an enlarged partial sectional view of a lock-up piston and a friction material, according to an embodiment of the present invention.

FIG. 2 is an enlarged partial sectional view of the piston and the friction material, showing an embodiment of the present invention. The friction material 12 is secured to the piston 1 by an adhesive or the like in a condition that a friction surface 14 is opposed to the front cover 2 (FIG. 1). The substantially annular friction surface 14 has a predetermined width in a radial direction and is formed between a radial inner edge 13a and a radial outer edge 12b of the friction material 12.

The friction surface 14 is provided with an outer peripheral friction surface 15 tapered from a radial central area toward the outer edge 12b and an inner peripheral friction surface 13 extending from the radial central area to the inner edge 13a. The outer peripheral friction surface 15 is tapered so that a thickness of the friction material is gradually decreased toward the outer edge 12b and the inner peripheral friction surface 13 is formed as a surface which is substantially in parallel with the surface of the piston 1.

By molding the friction material 12 substantially at the same time when the friction material 12 is secured to the piston, the inner peripheral friction surface 13 and the outer peripheral friction surface 15 are formed. However, after the friction material 12 is secured, the tapered outer peripheral friction surface 15 may be formed.

The inner peripheral friction surface 13 and the outer peripheral friction surface 15 are both subjected to a cutting operation to remove undulation and roughness from these surfaces.

At the initial engagement between the piston 1 and the front cover 2 (mainly, upon performing the slip lock-up control), the outer peripheral friction surface 15 is engaged by the front cover 2; whereas, at the complete tightening (at high pressure engagement), both of the outer peripheral friction surface 15 and the inner peripheral friction surface 13 are engaged by the front cover 2. In this case, since both of the outer peripheral friction surface 15 and the inner peripheral friction surface 13 were subjected to the cutting operation, the surface roughness is removed, so that a contacting condition of the interface between the friction material 12 and the front cover 2 can be maintained in a good (uniform) condition. Further, the contact condition during the sliding movement is stabilized, thereby enhancing the reduction of the judder. Since the sealing ability of the interface is enhanced, the capacity can also be enhanced.

The term "complete tightening" means a full lock-up condition in which the inner peripheral friction surface 13 and the outer peripheral friction surface 15 are closely contacted with the front cover 2.

Figure 3:
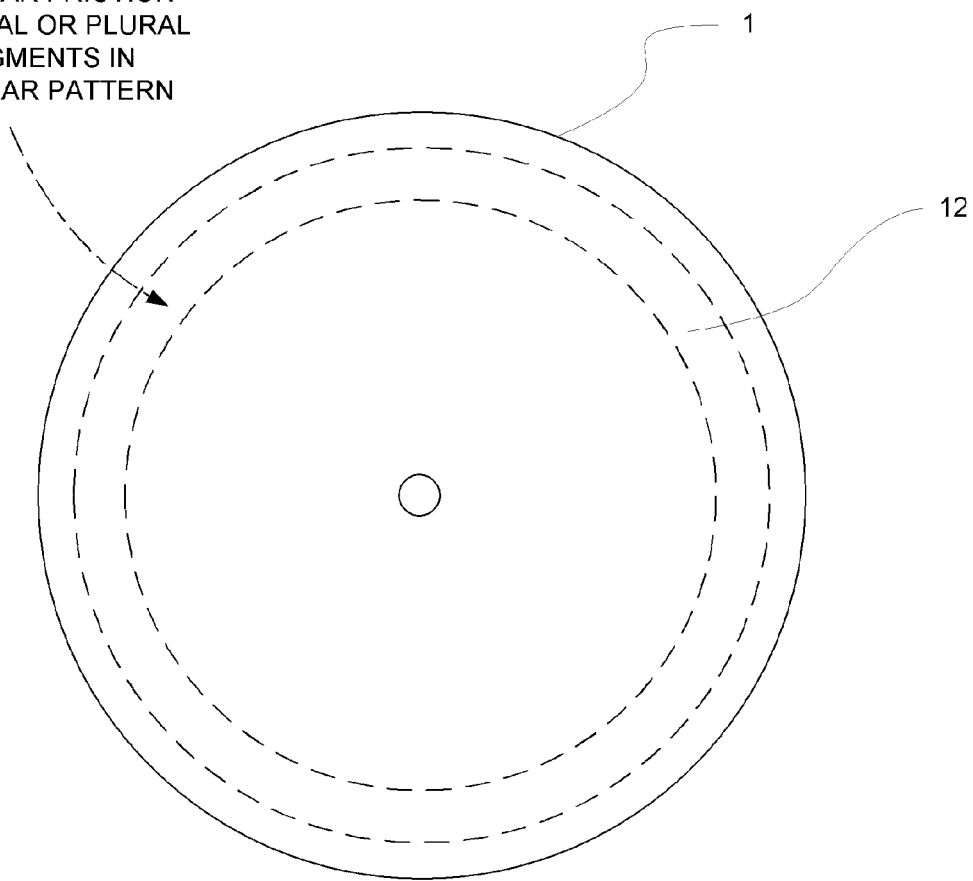
FIG. 3 is an axial diagrammatic illustration showing the friction material in an annular arrangement.

In the above-mentioned embodiment, while an example that the friction material 12 is secured to the piston 1 was explained, the friction material 12 may be secured to the front cover 2. In this case, the friction surface 14 is urged against the piston 1. In the above-mentioned embodiment, while an example that the friction material 12 has the substantially annular shape was explained, the friction material may not necessarily have the annular shape, but the friction material may be constituted by a plurality of separate segments arranged in an annular pattern, as indicated diagrammatically in FIG. 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2005-327552 filed Nov. 11, 2005, which is hereby incorporated by reference herein.

What is claimed is:

1. A lock-up clutch mechanism for a torque converter, comprising:
   a lock-up piston;
   a front cover opposed to said lock-up piston; and
   a friction material having a friction surface secured to one of said lock-up piston and said front cover, said friction surface including a cut outer peripheral friction surface which is engaged at an initial stage of engagement between said lock-up piston and said front cover, and a cut inner peripheral friction surface which is engaged upon tightening,
   wherein said outer peripheral friction surface has a taper with respect to said inner peripheral friction surface, and both of said inner peripheral friction surface and said outer peripheral friction surface are simultaneously engaged upon said tightening, and
   wherein a thickness of the friction material decreases from a radially inner portion of the outer peripheral friction surface to a radially outer portion of the outer peripheral friction surface.

2. A lock-up clutch mechanism according to claim 1, wherein said friction material is secured to said lock-up piston.

3. A lock-up clutch mechanism according to claim 1, wherein said friction material is secured to said front cover.

4. A lock-up clutch mechanism according to claim 1, wherein said cut inner peripheral friction surface and said cut outer peripheral friction surface have been subjected to a cutting operation which removes undulation and surface roughness.

5. A lock-up clutch mechanism according to claim 1, wherein surface properties of said cut inner peripheral friction surface and said cut outer peripheral friction surface are substantially uniform.

6. A lock-up clutch mechanism according to claim 1, wherein said inner peripheral friction surface is substantially parallel to a surface of said one of the lock-up piston and the front cover to which the friction material is secured.

7. A lock-up clutch mechanism for a torque converter, comprising:
   a lock-up piston;
   a front cover opposed to said lock-up piston; and
   a friction material secured to one of said lock-up piston and said front cover, said friction material including a plurality of separate friction material segments arranged in an annular pattern and each having a friction surface portion, said friction surface portion including a cut outer peripheral friction surface which is engaged at an initial stage of engagement between said lock-up piston and said front cover, and a cut inner peripheral friction surface which is engaged upon tightening,
   wherein said outer peripheral friction surface has a taper with respect to said inner peripheral friction surface, and both of said inner peripheral friction surface and said outer peripheral friction surface are simultaneously engaged upon said tightening, and
   wherein a thickness of each friction material segment decreases from a radially inner portion of the outer peripheral friction surface to a radially outer portion of the outer peripheral friction surface.

8. A lock-up clutch mechanism according to claim 7, wherein said friction material is secured to said lock-up piston.

9. A lock-up clutch mechanism according to claim 7, wherein said friction material is secured to said front cover.

10. A lock-up clutch mechanism according to claim 7, wherein said cut inner peripheral friction surface and said cut outer peripheral friction surface have been subjected to a cutting operation which removes undulation and surface roughness.

11. A lock-up clutch mechanism according to claim 7, wherein surface properties of said cut inner peripheral friction surface and said cut outer peripheral friction surface are substantially uniform.

12. A lock-up clutch mechanism according to claim 7, wherein each inner peripheral friction surface is substantially parallel to a surface of said one of the lock-up piston and the front cover to which the friction material is secured.

* * * * *